United States Patent [19]

Greanias et al.

[11] Patent Number: 5,157,384

[45] Date of Patent: Oct. 20, 1992

[54] ADVANCED USER INTERFACE

[75] Inventors: Evon C. Greanias, Chevy Chase, Md.; Guy F. Verrier, Reston, Va.; Gordon W. Arbeitman, Gaithersburg; Alan R. Tannenbaum, Washington Grove, both of Md.; Yu L. An, Vienna, Va.

[73] Assignee: International Business Machines Corporation, Armonk, N.Y.

[21] Appl. No.: 344,879

[22] Filed: Apr. 28, 1989

[51] Int. Cl.$^5$ .............................................. G09G 5/00
[52] U.S. Cl. ..................................... 340/706; 340/712
[58] Field of Search ............... 340/706, 712; 364/188, 364/189, 190; 178/18

[56] References Cited

U.S. PATENT DOCUMENTS

| | | | |
|---|---|---|---|
| 4,451,895 | 5/1984 | Sliwkowski | 364/521 |
| 4,587,630 | 5/1986 | Straton et al. | 340/706 |
| 4,689,761 | 8/1987 | Yurchenco | 364/708 |
| 4,726,065 | 2/1988 | Froessl | 381/41 |
| 4,803,463 | 2/1989 | Sado . | |
| 4,899,138 | 2/1990 | Araki et al. | 340/712 |
| 4,903,012 | 2/1990 | Ohuchi | 340/712 |
| 4,908,612 | 3/1990 | Bromley et al. | 340/706 |
| 4,931,950 | 6/1990 | Isle et al. | 364/188 |
| 4,972,496 | 11/1990 | Sklarew . | |

OTHER PUBLICATIONS

"Multimedia User Interface for Office Workstation" By Ishii, et al. Euromicro, pp. 433-440, 1985.

Primary Examiner—Jeffery A. Brier

[57] ABSTRACT

An advanced user interface for use with a computer system operating on an integrated operating environment. The integrated operating environment allows a plurality of application programs to be running simultaneously, one of which is designated the active application program to which all input data is directed. The advanced user interface allows a user to select among user-friendly input devices to operate any application program according to his individual preferences without change to the application program code. The advanced user interface includes alternate input modules which translate the input signals transmitted from the various input devices into input messages useable by the rest of the interface. The advanced user interface also includes interface profiles which contain mappings of the input messages against corresponding commands useable by the application programs, the integrated operating environment or other modules of the advanced user interface itself. An environment link module refers to the interface profiles and matches the input message against the corresponding command for the application program active at the time the input signal was transmitted and send the corresponding command to that application program.

47 Claims, 7 Drawing Sheets

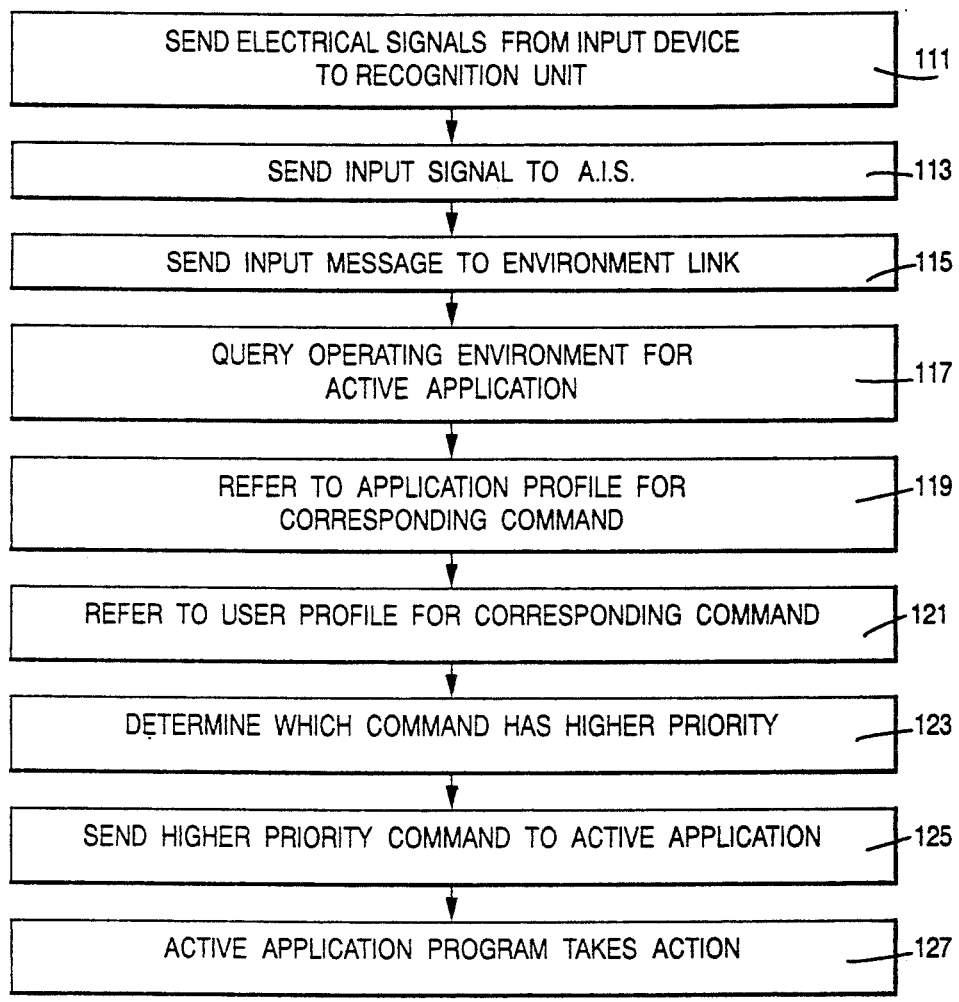

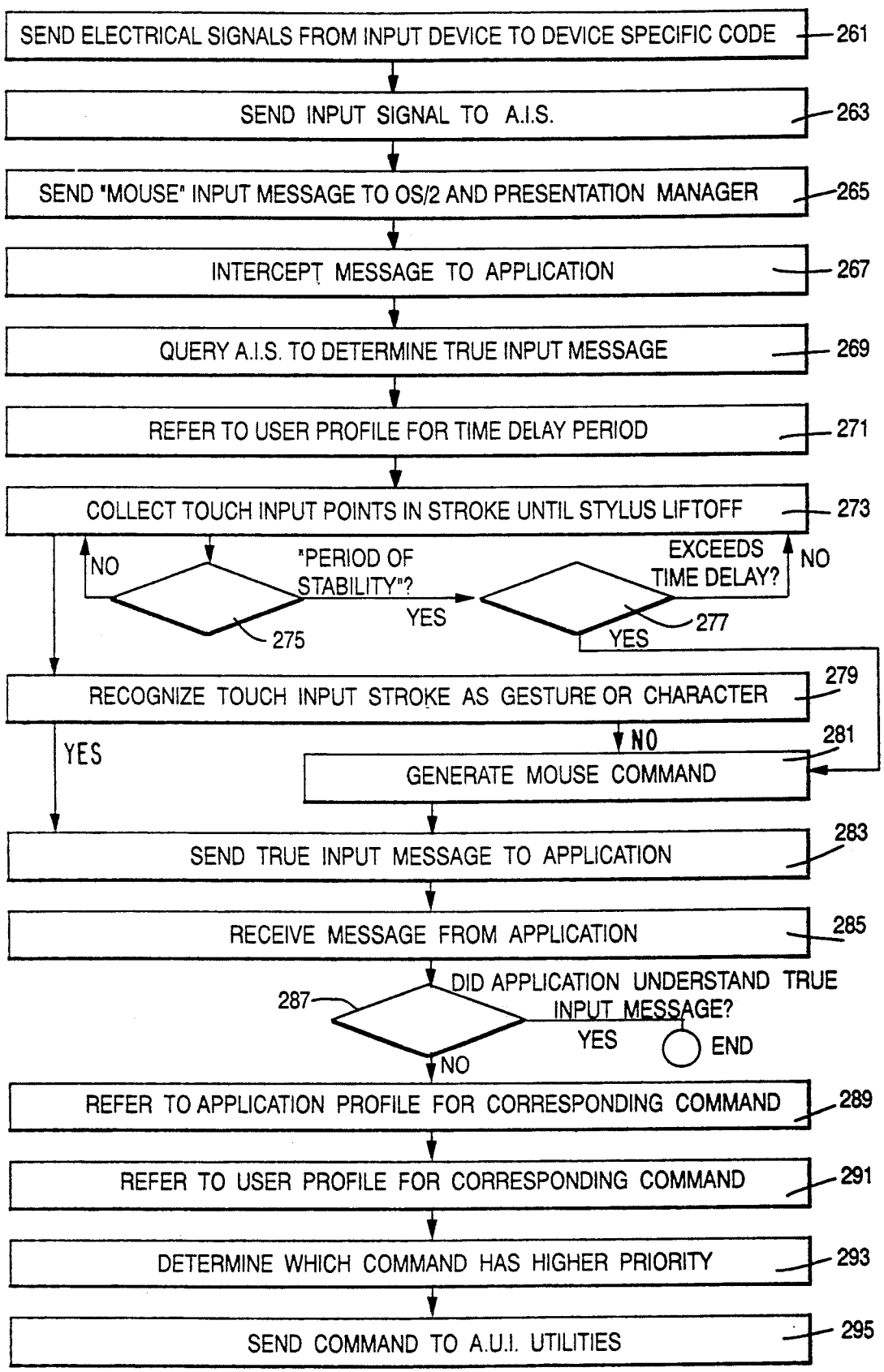

ADVANCED USER INTERFACE

BACKGROUND OF THE INVENTION

This invention relates to improvements in entering input data into digital computers. More particularly, it relates to an advanced user interface which allows a user to select one or more input devices to input data into a computer running a program originally written for a different input device in a multiapplication environment.

In the past, computers were used only by scientists, mathematicians, and other high-level, sophisticated computer users. As computer technology progressed, and particularly with the advent of the personal computer, data processing has reached every level of society, and every level of user. The trend is for fewer computer users to be computer professionals or sophisticated in data processing techniques. Access to computers will increase even further in the future as computer hardware and software increase in power and efficiency.

However, despite the prevalence of computers in our society, many are apprehensive about using them. The traditional text display and alphanumeric keyboard input device are not readily learned, requiring the memorization of the correct format of dozens, if not hundreds, of commands. Unless the user is a reasonably good typist, data entry can be inconvenient and time consuming. The hours of experimentation which may be necessary to become proficient with a single piece of software becomes extremely frustrating for the unsophisticated user who is likely to avoid the effort altogether.

It has therefore become necessary to design what have become known in the art as "user friendly" input devices and computer programs. Such "user friendly" devices and software are designed to allow an unsophisticated user to perform desired tasks without extensive training. One of the more popular input devices is the mouse pointing device. The mouse generates signals corresponding to the direction and distance it is moved across a flat surface by the user. The computer responds to this information by changing the position of the cursor on the computer display to allow the user to point to any displayed object. Once the cursor is correctly positioned, the user can perform a number of functions by depressing one or more buttons on top of the mouse.

Human factor studies have shown that a device which allows the user to input data directly on the visual display screen of a computer, generally known in the art as a touch input device, achieves greatest immediacy and accuracy between man and machine. One of the first input devices for use at the display surface was the light pen. The light pen is an optical detector in a hand held stylus, which is placed against the face of a cathode ray tube. The location of the light pen is determined by detecting the coordinates of the dot of light which is the scanning raster of the display. A second type of touch input device is a mechanical deformation membrane which is placed over the display screen. The membrane is a transparent overlay which consists of two transparent conductor planes disposed on a flexible surface. When a selection is made, the user mechanically displaces one of the conductor planes to touch the other by a finger or stylus touch, thereby bringing the conductors into electrical contact with each other. Appropriate electronics and software translate the electrical signals generated by the finger or stylus touch to the position on the display surface. Another touch input device is a capacitive transparent overlay placed over the display screen, which includes transparent conductors driven by an electromagnetic signal. The input device can detect the location of a finger touch by the change in capacitance of the overlay or, alternately, a stylus is used to return the electromagnetic signals from the overlay back to the computer to determine the stylus position. Yet another touch input device uses a frame which fits around the display screen having a number of infrared or visible light transmitters and receptors arranged in parallel horizontal and vertical directions. When the user's finger blocks the light beams, the horizontal and vertical receptors note the absence of the signals, thereby locating the position of the action desired by the user.

Many other user friendly input devices which respond to actions of the user such as voice recognition units or digital tablets, have been developed.

In addition to user friendly input devices, designers have made efforts to develop more user friendly software. One technique which has been employed is to provide the user with a menu of choices of the particular tasks or functions which can be performed. In this way, the user is not required to commit long lists of commands to memory. The menu can be a full or partial screen display with spaces adjacent to the menu entries to which the cursor is moved by keyboard or by other cursor moving device to select a particular action. Alternatively, the user can select an action by entering an alphanumeric character associated with the menu selection on a command line.

Another recent trend is to provide some sort of integration of computer program applications. Without integration, the user must employ separate application programs for word processing, database manipulation, graphics and electronic mail functions, and so forth. It is often quite difficult to integrate the outputs of the different programs into a single desired output. One solution has been to write a single integrated piece of software which incorporates a variety of applications which is called a multiple-function program. Typically, these multiple-function programs include text, spreadsheet, and business graphing applications.

Another approach is to provide an integrated operating environment as implemented by Microsoft WINDOWS ™ or IBM Presentation Manager ™. In this approach, individual application programs share information and often appear on the display screen at the same time, each in its own window. By selecting the strongest individual application programs, a much more powerful environment can be tailored for the user's particular needs, in contrast to multi-function programs where the user is limited to whatever applications have been programmed into the package.

Unfortunately, while many user friendly input devices and many user friendly computer programs have been developed, these efforts have not been well integrated. For example, there are a large number of programs which have been written to accept keyboard or mouse input which do not recognize information from a touch input device or voice recognition unit. This situation presents a severe obstacle to the introduction and widespread use of new user friendly input devices. Either a programmer must make extensive revisions to a large body of existing software, or must write a new multiple function program, or set of application programs each time a new input device is developed. Either alternative adds significantly to the costs and time of a development effort and may be beyond the capabilities of the organization developing the input device or render the effort too expensive for the expected benefits. In addition, copyrights or other proprietary rights may prevent the input device developer from adapting existing software. Further, newly developed software may not be as efficient or commercially acceptable to users as the established application programs already written for a particular purpose.

A final consideration is that the individual user is probably best suited to assessing his own needs, yet is least likely to be able or interested in undertaking extensive revisions in application programming. It would be advantageous to allow a user to select the particular input devices and application programs which would best serve his purposes and yet with only a relatively low level of expertise, allow him to assemble the components in a user friendly interface between himself and the computer. The general solution developed by the programmer may not be optimum for a particular user's needs. It would also be advantageous to assure a user that future advances in input devices and application programs can be accommodated by the interface with a minimum of revision.

SUMMARY OF THE INVENTION

It is therefore an object of the invention to allow a user to select between a plurality of input devices to input data into a computer system.

It is another object of the invention to input information to a computer system via a different input device than that for which the active application program was originally written without revising the application program code.

It is still another object of the invention to allow a relatively unsophisticated user to select among available application programs and input devices and construct a user interface designed particularly to his needs.

It is yet another object of the invention to accommodate future advances in user friendly input devices and application programs in a user interface.

It is still yet another object of the invention to allow different users who operate a single computer to construct different user interfaces to accommodate individual preferences in inputting data.

These objects and others are accomplished by an advanced user interface which operates with an integrated operating environment capable of running a plurality of application programs and which utilizes the message and focusing functions provided by the environment. The advanced user interface is comprised of three major modules, an alternative input subsystem module, an interface profile module, and an environment link module. The alternative input subsystem module provides communication between the attached user friendly input devices and the remainder of the advanced user interface as well as application programs through the integrated operating environment. The alternative input subsystem module receives the input signals generated by the input devices and translates them to input messages useable in the advanced user interface.

The interface profile module comprises a set of application profiles, one for each application program for which the user wishes to use an input device in a different manner from the way in which the application program was originally written. An entirely new input device may be used with the application program, or optionally, the user may change the input signals of the existing input device from those to which the application program originally responded. Each application profile contains a list of input messages mapped to corresponding commands useable by the application program. The interface profile module may also comprise a set of user profiles for each user who utilizes the computer system. The user profile contains a list of input messages and their corresponding commands which can be common to several application programs.

The environment link module communicates with integrated operating environment and contains algorithms for the execution of the advanced user interface procedures. For example, it takes the input messages generated by the alternate input subsystem, queries the integrated operating environment as to which application program is active, matches the input messages to the corresponding commands in the appropriate application profile within the interface profile module, and initiates an action based on the set of instructions such as sending messages to the active application program via the operating environment. The advanced user interface may also include a set of utility programs such as a pop-up keyboard or an image magnifier utility.

BRIEF DESCRIPTION OF THE DRAWINGS

FIG. 4 is a flow diagram of the operation of the first embodiment of the present invention in response to a voice input signal.

FIG. 5 is a diagram of an application profile.

FIG. 8 is a flow diagram of the operation of a computer module which distinguishes between touch input meant to emulate a mouse pointing device and touch input meant to be a gesture or character.

DETAILED DESCRIPTION OF THE PREFERRED EMBODIMENT

Figure 1:
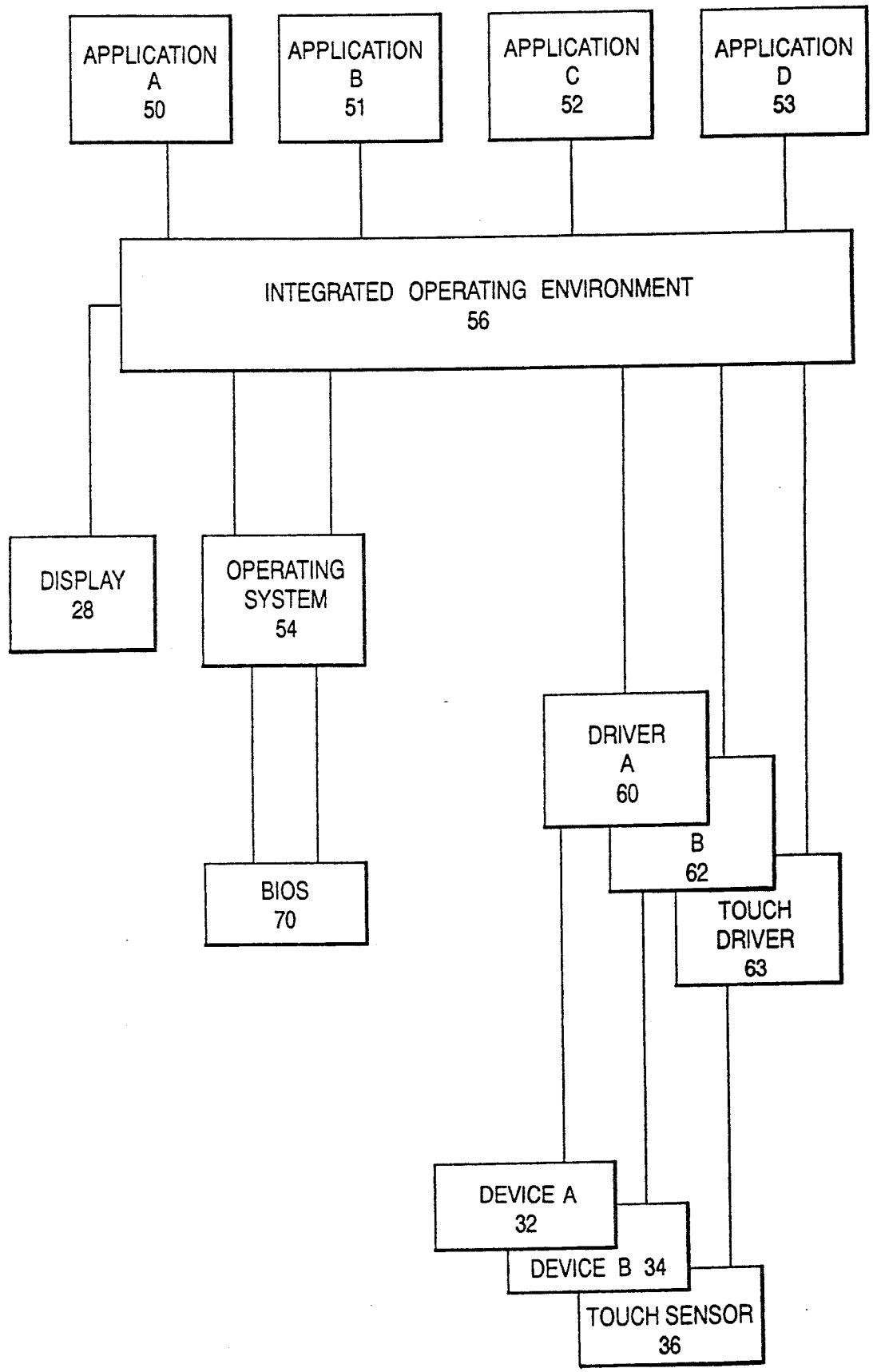
FIG. 1 is a block diagram showing the interaction of computer system software and hardware in response to actions of user using an integrated operating environment such as Presentation Manager ™.

FIG. 1 shows the interaction of the user and the computer system utilizing application programs A, B, C and D 50–53 in a typical integrated operating environment such as Presentation Manager ™ 56.

The user inputs data into the computer system via device A (keyboard) 32, device B (mouse) 34 or touch sensor 36. As the user inputs data, the selected device generates an interrupt to activate the appropriate driver. In the case of the keyboard 32, driver A 60 is activated; in the case of the mouse 34, driver B 62 is energized; and input to the touch sensor 36 activates the touch driver 63. The appropriate driver signals the integrated operating environment 56. The integrated operating environment 56 keeps track of which application program is active and sends all input data to that application program. Alternatively, the user can change application programs, and the integrated operating environment 56 will route the message to the new active application program. In one preferred embodiment, application program A 50 is a spreadsheet program, application program B 51 is a word processor, application program C 52 is a drawing program, and application program D 53 is an electronic mail facility. Keeping track of the active program is a "focusing function", as the integrated operating environment 56 determines the "focus" of the user at a given time. For purposes of illustration, assume the user is inputting data via the keyboard 32 and the spreadsheet 50 is the active application program. The spreadsheet 50 then decides what action should be performed. Generally, this action will fall into one of three categories: the spreadsheet 50 will change the display 28, the spreadsheet 50 will communicate with other I/O devices such as a printer, or the spreadsheet 50 will communicate with other applications. All of the messages are handled by the integrated operating environment 56.

While the prior art integrated operating environments allow easier access to multiple application programs, and therefore, the user can select the particular application programs which best suit his needs, the user can only communicate with the application program with the input devices for which it has been written. For example, spreadsheet 50 is a program which has been written for a combination of keyboard 32 and mouse 34. Although a touch driver 63 can be developed to communicate coherently with the integrated operating environment 56, by converting input signals generated by the touch sensor 63 into mouse movements and mouse clicks, the capabilities of the touch input device 36 are limited by the repertoire of the mouse device. New categories of touch commands such as handwriting recognition or gestures cannot be easily accommodated by this method, especially by an application program such as spreadsheet 50 which has no understanding of what the types of touch commands mean. Other new input devices are more drastically limited. Thus, although the system designer or user would like to include new user-friendly input devices into an individual workstation, he may find it impossible or severely limiting to use existing software.

Figure 2:
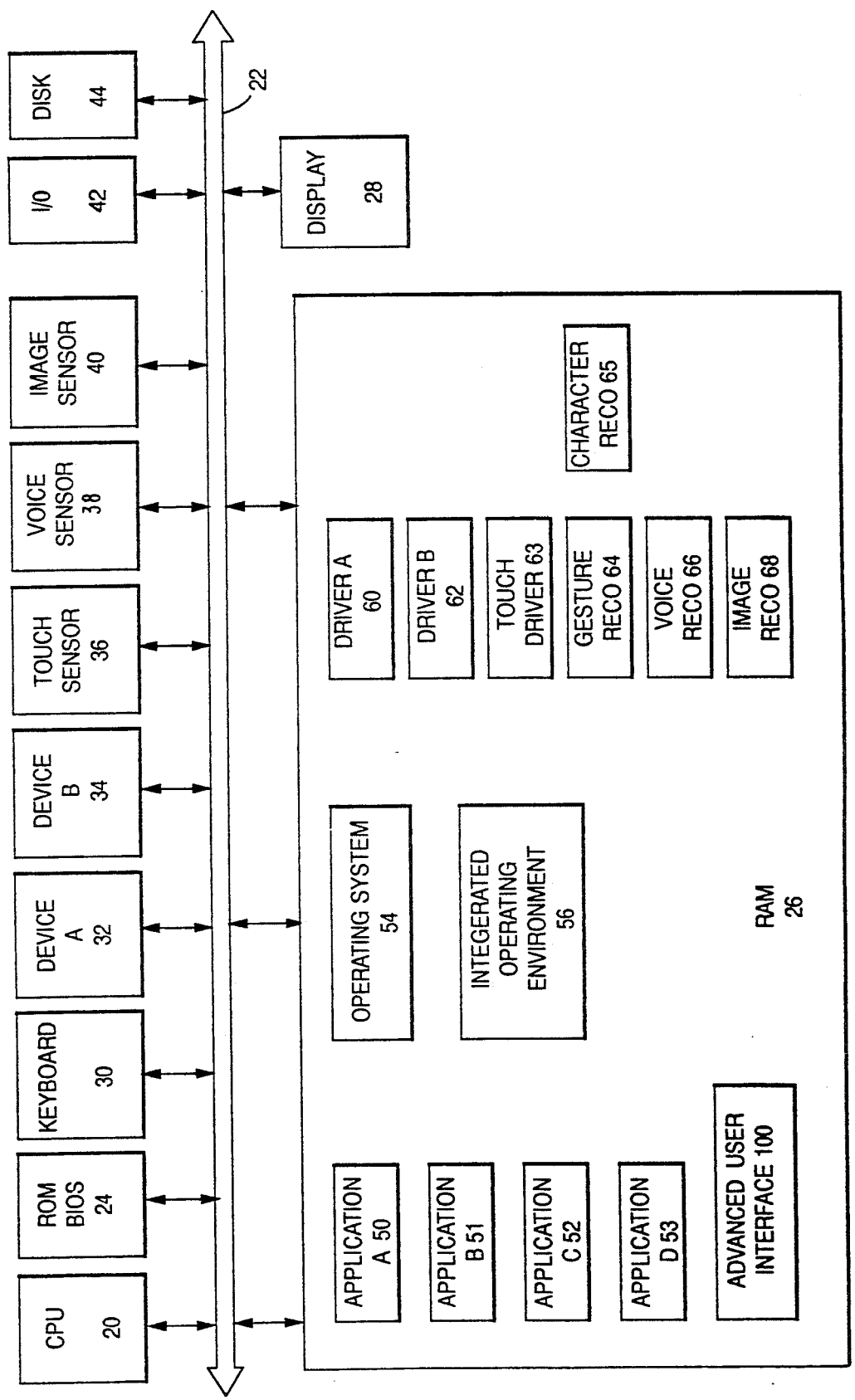
FIG. 2 is an architectural block diagram of a computer system in accordance with the present invention, depicting the memory having read therein a series of application and operating system programs.

The preferred embodiment of the invention comprises a set of computer programs for controlling the interaction between a user and a computer system as shown in FIG. 2. The invention is primarily envisioned for use with a personal computer such as the IBM PS/2 TM; however, the principles of this invention can be extended to other individual workstations or to much larger data processing systems. The architectural block diagram of FIG. 2 includes a central processing unit (CPU) 20 connected by means of a system bus 22 to a read-only memory (ROM) 24 and a random access memory (RAM) 26. Also included in the computer system in FIG. 2 are a display 28 by which the computer presents information to the user, and plurality of input devices including a keyboard 30, and devices A 32 and B 34, which for the purposes of illustration in the following description are a second alphanumeric keyboard 32 and a mouse 34, but which could be a specialized keyboard such as a numeric keyboard, and a remote pointing device or a variety of other input devices. The computer system further comprises a touch sensor 36 or touch input device for use at the surface of the display 28, a voice sensor 38 and an image sensor 40. The I/O 42 can be connected to communication lines or other I/O equipment.

The random access memory (RAM) 26 includes application program A 50, application program B 51, application program C 42, and application program D 53. Examples of typical application programs would include word processors, spreadsheets, graphic programs, electronic mail, and data base programs. The RAM 26 also stores an operating system 54, such as DOS TM or OS/2 TM, and an integrated operating environment program 56, such as WINDOWS TM or Presentation Manager TM, which allow several application programs to be running concurrently. Other software includes driver A 60 and driver B 62, which interpret the electrical signals generated by the second keyboard 32 and the mouse 34 respectively for the operating environment 56. The touch driver 63, the gesture recognition unit 64 and character recognition unit 65 handle input signals from the touch sensor 36. Input signals from the voice sensor 38 and the image sensor 40 are processed by the voice recognition unit 66 and image recognition unit 68 respectively. Although depicted in FIG. 2 as entirely software, driver A 60, driver B 62, touch driver 63, gesture recognition unit 64, voice recognition unit 66 and image recognition unit 68 can also be a combination of hardware and software. Finally, also resident in RAM 26 are the set of software modules which make up the advanced user interface 100.

First Embodiment

Figure 3:
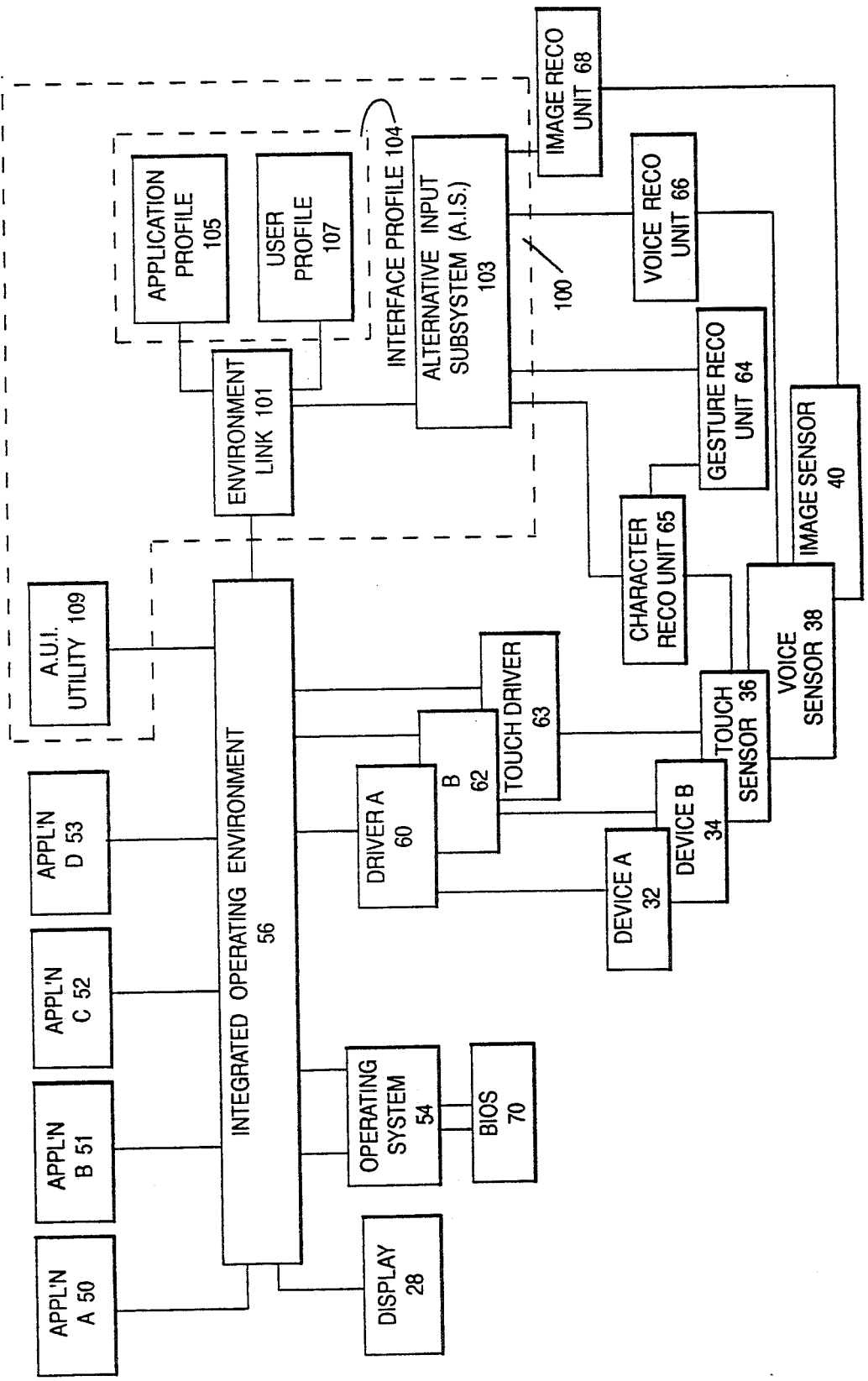
FIG. 3 is a block diagram showing the interaction of computer system software and hardware in response to actions of a user designed in accordance with a first embodiment of the present invention.

FIG. 3 shows a computer system designed in accordance with the present invention. Rather than being connected to the integrated operating environment 56 via a standard device driver at least one of the plurality input devices is connected to the advanced user interface 100, via a recognition unit. In FIG. 3, the voice sensor 38 and image sensor 40 are connected to the advanced user interface (AUI) 100 via their respective recognition units, voice recognition unit 65 and image recognition unit 68. A keyboard 32, and a mouse 34, remain connected to integrated operating environment 56 via their respective drivers driver A 60 and driver B 62, since many application programs recognize keyboard and mouse input. Finally, in FIG. 3, the touch sensor 36 is connected to both the integrated operating environment 56 via the standard touch driver 63 and to the advanced user interface 100 via the gesture recognition unit 64 and the character recognition unit 65. The touch driver 63, gesture recognition unit 64 and character recognition unit 65 translate signals from the touch sensor 36 to produce gesture or character "tokens" respectively. The series of positions of a finger or stylus on the surface of the touch sensor 36 can be recognized as handwritten alphanumeric characters by the character recognition unit 65, or as a gesture such as a circle or right hand arrow by the gesture recognition unit 64. The voice recognition unit 66 digitizes the sound received by the voice sensor 38 and performs pattern matching against previously defined sound patterns to produce voice "tokens". Image recognition unit 68 processes information from the image sensor 40 and outputs image "tokens". A "token" is an input message which represents a series of electrical signals collected from an input device. For example, the series of points collected when a user draws a circle on the touch sensor can be defined as the "circle token". Coupling the touch sensor 36 to integrated operating environment 56 allows the user to take advantage of application programs which are specifically written for the touch sensor 36 or other existing application programs for which only primitive mouse input signals are needed. Yet as the touch sensor 36 is also connected to AUI 100 through the gesture recognition unit 64 and the character recognition unit 65, application programs which do not recognize touch input can still accept gesture or character "tokens" due to the translation capabilities of the advanced user interface 100.

In other embodiments, the keyboard 32 and mouse 34 are connected to both the AUI 100 and integrated operating environment 56 as is the touch sensor 36. In still other embodiments, all input devices are attached directly to the AUI 100 alone. By using a keyboard AUI link, a user could change the normal typewritten commands for an application program to those which he finds more convenient to input or memorize. As the AUI 100 is written as an application program, it is able to use the communication and focusing capabilities of the integrated operating environment.

Another preferred embodiment of the present invention uses a single pointing device driver (not pictured) to combine the function of driver B 62 and touch driver 63 by accepting input from both mouse 34 and touch sensor 36 as well as any other pointing device. This embodiment is particularly adapted to operate with the touch input device described in U.S. Pat. No. 4,686,332, to E. Greanias, et al., entitled "Combined Finger Touch and Stylus Detection System for Use on the Viewing Surface of a Visual Display Device", filed Jun. 26, 1986, or the remotely sensed stylus described in commonly assigned patent application, Ser. No. 264,409, filed Oct. 28, 1988, entitled "Remotely Sensed Personal Stylus", by E. Greanias, et al., which are hereby incorporated by reference. The pointing device driver arbitrates between mouse input from the mouse 34 and finger and stylus input from the touch input device 36 and sends appropriate input messages to the integrated operating environment 56.

Referring back to FIG. 3, the AUI 100 is further divided into several computer code modules. The environment link module 101 contains algorithms for the execution of the procedures of the AUI 100 and provides communication capabilities to the integrated operating environment 56. The Alternative Input Subsystem (AIS) 103 provides an interface description which allows the designers of new user friendly input devices, e.g., voice sensor 38, to seamlessly interconnect with the Advanced User Interface 100. The AIS 103 translates the input signals sent by the input devices and their respective recognition units to input messages useable by the remainder of the Advanced User Interface 100. A part of each input message, such as a prefix GS/ to denote a gesture, will be devoted to identify the input device from which the input signal is received. In this embodiment, the AIS 103 also time stamps each input message so that the correct application program receives the appropriate commands.

The interface profile module 104 is comprised of sets of application profiles 105 and the user profiles 107, which are files which list input messages produced by the AIS 103 from the input signals received by input devices 36, 38, 40, mapped to keyboard, mouse or other commands which are usable by existing application programs, e.g., mouse clicks, keystroke messages, MACROs, utility programs, etc. The Advanced User Interface utility (AUI utility) 109 is a set of utility programs such as a pop-up keyboard or an image magnifier utility which can be used with AUI 100. As shown, the AUI utility 109 can be written as a separate application program, or set of application programs, so that it can use the message passing capabilities of the integrated operating environment 56 to communicate with other application programs.

A few examples of utilities which might be found in the advanced user interface utilities 109 include a "popup" keyboard, a "pop-up" numeric keypad, an image magnifying utility and an electronic mail routing slip. The "pop-up" keyboard and "pop-up" keypad are functions which are preferably designed to operate with a touch input device at the display surface. By issuing the proper command, e.g., a circle gesture or touching a keyboard icon, the keyboard or keypad will "pop-up" on the screen. A user can quickly enter columns of alphanumeric information directly on the screen by touching the keys displayed on the screen, thus eliminating the need to divert their attention to manual keyboard. The space needed for the keyboard or keypad is quite small, and will not completely obscure the work area of the spreadsheet, word processor, etc., which is the active application program. The image magnifying utility will magnify a rectangle of fixed size around a point at which the appropriate gesture was made. The utility allows very accurate positioning of a cursor in the expanded image. After stylus liftoff, the normal size display is restored, and the selected cursor coordinates are sent to the active application program.

The flow diagram in FIG. 4 depicts the operation of the computer system in FIG. 3 in response to a voice input signal. The active application program is the spreadsheet 50, and presented to the user on the display 28 is an array of selected data concurrently with a menu bar of possible functions available to the user. Rather than striking a series of keys on the keyboard, the user elects to input data into the computer system using another input device, the voice sensor 38. In response to the user vocalizing the word "GRAPH", at 111 the voice sensor 38 generates electrical signals and sends them to the appropriate translation device, the voice recognition unit 66. In response to these electrical signals, the voice recognition unit is activated at 113 and sends an appropriate input signal, a voice input "token", to the Alternate Input Subsystem 103. At 115, the AIS 103 forwards an input message to the environment link 101 which contains information on the time the input signal was received and which input device sent the signal. In response to the input message, at 117, the environment link 101 queries the integrated operating environment 56 as to which application program was active at the time the input signal was received. After determining the active application program, spreadsheet 50 at 119, the environment link 101 refers to the application profile 105 of the spreadsheet 50 for the command which corresponds to the input message "GRAPH" which will be recognized by the spreadsheet 50, i.e., the menu selection—graph—. The environment link 101 then at 121 checks the user profile 107 to determine whether there is a higher priority command which would override the command from the application profile 105. The environment link 101 determines which command has higher priority at 123. The environment link 101 at 125 then sends the higher priority command, in this example, the menu-selection command from the application profile 105, to the integrated operating environment 56 which routes the command to the active application program spreadsheet 50. The spreadsheet 50 at 127 takes the appropriate action in response to that command, in this case, graphing the currently selected data and changing the information presented to the user by the display 28 accordingly.

Interface Profiles

To understand the power and flexibility of the advanced user interface 100, the application profiles 105 and the user profiles 107 of the interface profile 104 must be explained in greater detail. Both types of profile associate a list lists of input messages with a list of corresponding commands which are recognized by the appropriate application program, the environment link module 101, or by the integrated operating environment 56 itself. The command can be the name of a program, an instruction recognized by the integrated operating environment or a MACRO. A MACRO is a file which contains an arbitrarily long string of "events" and/or utilities. An "event", for the purposes for this specification, is an input message which results from a user action such as a single keystroke, a mouse button press, a mouse button release, a mouse double click, single menu selection, a single gesture or other "token", or a single accelerator key selection. An example of a utility is the pop-up keyboard. A MACRO may also treat other previously defined MACROS as commands. Accelerator keys are often a feature of the integrated operating environment 56. They specify a keystroke sequence which emulates a menu selection. For example, an application may specify that the DELETE key is the same as selecting CUT from the EDIT menu and that SHIFT/INSERT is the same as selecting PASTE from the EDIT menu. These two examples are, in fact, widely used accelerators.

Each application program may have its own application interface profile 105, which contains mappings of input messages and their corresponding commands for each input device connected to the alternate input subsystem 103. For example, one application profile might contain input messages and commands as shown in FIG. 5. The sample application profile shows input messages mapped against the corresponding command together with comments for display to the user describing the user action needed to create the input message and comments describing the action the computer system will take upon receiving that input message when the given application is active.

The same input message from the AIS 103 will generally invoke a different MACRO on different application profiles 105. For example, a certain application profile 105 may specify that a MACRO named "Cut/Paste" should be executed in response to a Right-Arrow gesture, while a different application profile 105 may map the Right-Arrow gesture to the keystroke sequence "Form 201 (ENTER)". When the gesture recognition unit 64 detects a right arrow gesture from the touch sensor 36, it calls environment link 101 which determines the application program which owns the currently active window. The environment link 101 reads the corresponding application's profile 105, merges that information with the appropriate user's profile 107, choosing the command with higher priority, then issues the command to the active application program the integrated operating environment 56 or to other AUI modules as appropriate.

The user profile 107 contains commands which are common to all or several of the application programs 50-53. A separate user profile 107 can be written for each system user. The advanced user interface can determine the active user during log-on procedures. Entries in the user profile 107 can be used to override those in the application profiles 105. This situation might occur when a particular user prefers to input data in a different manner from that provided by the application profile 105 written for a group of system users. The user profile 105 can also be used to provide a global default action, i.e., if a particular input message was not found by PM-Link 101 in the appropriate application profile 105. Where a user profile 107 is used for a global default action, the application profile 105 which has a MACRO for a given input message can be given a higher priority than the default action.

While the preferred embodiments of the present invention make a distinction between the application profiles 105 and the user profiles 107, in other embodiments, it is possible to write separate application profiles 105 for each user. Where the interface profile module 104 was organized in this manner, if an application profile 105 did not exist for a particular user, the environment link 101 would refer to a default application interface profile 105. The default application profile 105 would be provided with the application program, the input device or by the programmer configuring the computer system. As currently envisioned, an application profile 105 for a given application program would generally be provided with the application itself. Alternatively, all application profiles 105 as well as a general user profile 107 could be provided by the system programmer. For an unsophisticated user who does not wish to explore the power of the advanced user interface 100, the default profiles will usually be adequate. However, many users will wish to tailor the advanced user interface 100 to their particular desires and specification. Therefore, it will be necessary to either write or modify an existing application or user profile.

The Advanced User Interface Control Panel, one of the Advanced User Interface Utilities 109, allows the user to tailor many of the AUI functions to create a user unique profile in an extremely efficient and user friendly manner. Although the advanced user interface 100 contains fairly sophisticated computer code, through the use of the Control Panel, the user need not understand its workings. Among the functions offered by the AUI Control Panel is the ability to modify or create profiles. This is accomplished by invoking the interface profile create/modify module of the AUI Control Panel by selecting "PROFILE" from the Control Panel menu. The Control Panel first queries the user the name of the profile to be modified. At this point, a menu of the appropriate profile is displayed to the user, including a list of descriptions of user actions, e.g., circle gesture, "cut" voice command, etc., against a description of the action taken by the computer, i.e., the MACRO, in response to the user action. If there is no application or user profile associated with the name entered, the utility creates a new profile and displays a blank menu. The user moves the cursor through the menu to add or modify the information in the profile, and then invokes the record command function or the record MACRO function. For example, returning to the first item in FIG. 5, a single line of the menu for the spreadsheet application profile may read:

| USER ACTION | COMMAND |
|---|---|
| CIRCLE gesture on touch sensor | Invoke the pop-up keyboard |

If the user wants to change the input message from the circle gesture to a right hand arrow gesture, he moves the cursor to the user action field and selects "USER ACTION" from the menu. The user is prompted to perform the action by which he wishes to invoke the pop-up keyboard, and then is prompted to add a written description of the action to be displayed on the menu. Similarly, if the user wishes to change the MACRO invoked by the circle gesture, he moves the cursor to the MACRO field and enters the name of the MACRO to be executed.

The user creates a new profile in a similar fashion as an existing profile is modified. First, moving the cursor to a blank user action field, selecting "USER ACTION" from the menu, then when finished, moving the cursor to the corresponding macro field, entering a MACRO name or other command, and so forth until the profile is complete. Thus, it becomes a relatively straightforward procedure for a relatively unsophisticated user to construct the advanced user interface profiles for the application programs he has selected to allow him to input data into a computer system in the most advantageous manner.

A MACRO can be created independently from the creation of a user or application profile. In Presentation Manager TM 56, for example, there are three cooperating utilities which allow the user to create a MACRO, modify a MACRO and execute a MACRO.

The Macro Creation Utility (MCU) is a Presentation Manager TM program which can be set up as a tutorial, a prompter, or a totally invisible utility. It can be called from the standard program loader or via a designated gesture or other input signal. Its job is to record the user's sequence of commands for future playback. The user merely starts the MCU, performs the desired sequence of operations, then stops the MCU. The MCU then prompts the user for required information such as the name of the MACRO. Once the macro is named, the user can control the use of that MACRO by referring to it in any of his application profiles or in his user profile.

The Macro Modify Utility (MMU) is a Presentation Manager TM program which allows the user to single step through a previously created macro. MMU displays an English language description of each step in the macro before it executes. At any point in the playback process, the user can modify one or more commands in the macro. The modification may be performed by editing the contents of the English language window (for experienced macro writers) or by turning on the "record" function to overwrite previously stored commands. The MMU also allows the user to easily test, debug and modify MACROs. It also lets the user build MACROs by modifying existing MACROs which may already do most of what the user needs.

The Macro Execution Utility (MEU) is a Presentation Manager TM program which plays back the macro at full speed. The MEU could be called by the environment link 101 whenever the user issues the appropriate gesture. For example, if a left arrow gesture is recognized, the environment link 101 looks in the current User's Profile to determine if that gesture is "globally" inhibited. If not, the environment link 101 then determines the name of the active application and reads the corresponding Application Profile to determine what (if any) MACRO is linked to the left arrow gesture, for this application. The environment link 101 then calls the MEU, if necessary.

One example of a default user profile is described with reference to a touch input device substituting for a mouse pointing device. As many programs recognize mouse input, a great many application programs could be operated using this default profile.

In this example, the advanced user interface can be set in one of a plurality of modes which determine what mouse equivalent commands are found in the user profile as a result of stylus or finger actions. When the AUI is in mode one, no mouse button messages are generated by touchdown, mouse move commands are generated while the finger or stylus is moving in the touch panel. Upon lift-off of the stylus, a buttondown, buttonup command sequence is sent to the application program. Mode one allows accurate positioning of the cursor before action is taken by the active application. When the advanced user interface is in mode two, no mouse button commands are generated by touchdown, mouse move messages are generated by moving the stylus, and a mouse double click is generated upon lift-off. When the AUI is in mode three, a mouse button down command is generated on contact and a mouse button up command on lift-off of the stylus. Mode three is useful for dragging screen objects (icons, etc), sizing windows and marking areas in a window's client area (e.g., marking text which is to be moved). These modes may be selected manually by touching the touch panel repeatedly at an icon which indicates which mode the AUI is in, or automatically by the application profile.

Second Embodiment

Figure 6:
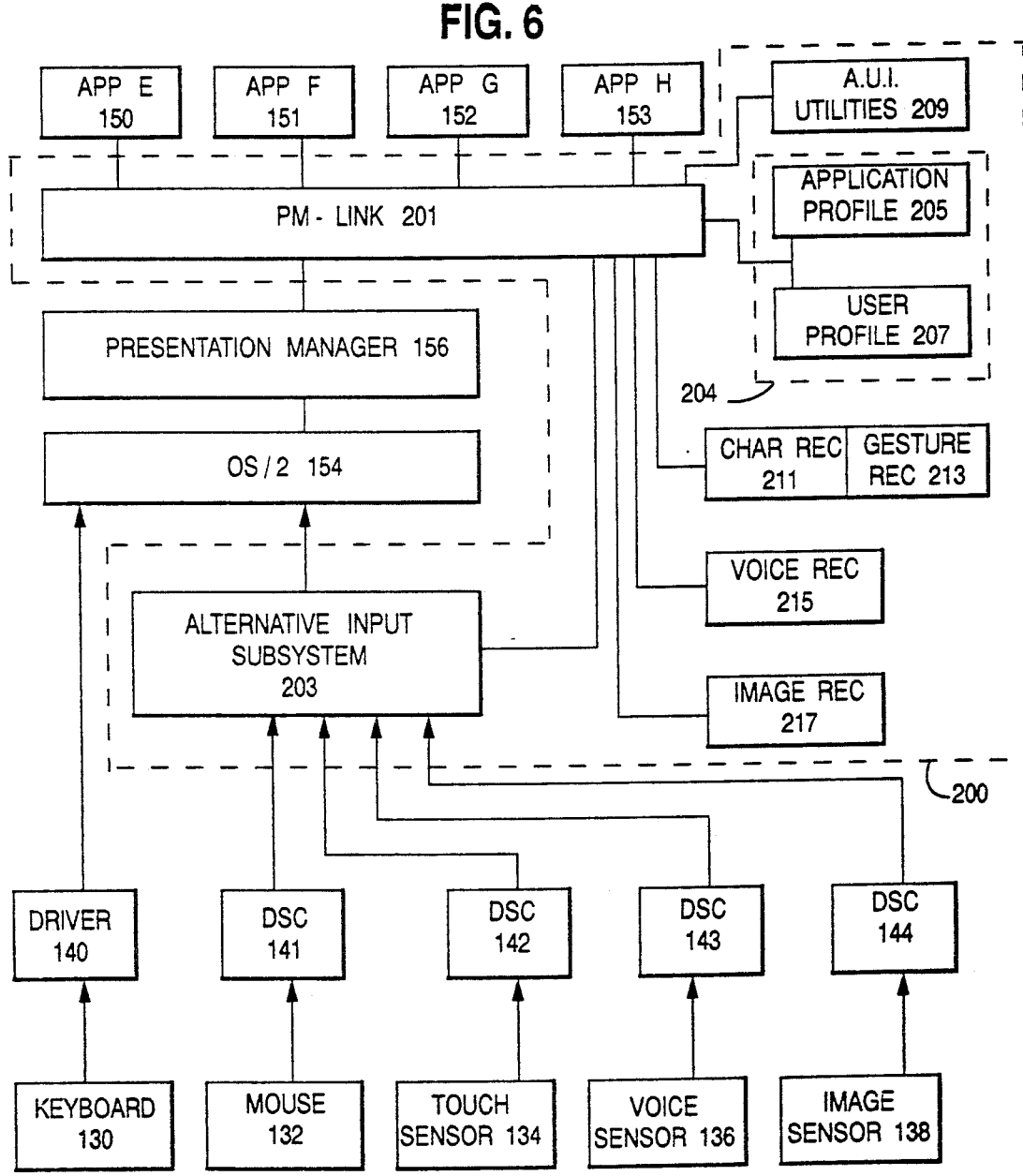
FIG. 6 is a block diagram showing the interaction of computer system software and hardware in response to actions of a user designed in accordance with a second embodiment of the present invention.

FIG. 6 shows another embodiment of the Advanced User Interface, where Presentation Manager TM 156 is used as the integrated operating environment, and OS/2 154 is the operating system which runs the computer system. Because of the peculiarities of OS/2 TM 154 and Presentation Manager TM 156, a slightly different arrangement of the Advanced User Interface 200 is necessary. OS/2 TM 154 has a single queue module which timestamps all input and requires that all input be queued within this module in the order in which it was transmitted to the computer system. Therefore, all of the alternate input devices must go through OS/2 TM 154 before being handled by the environment link module PM-Link 201. In addition, the present implementation of the single queue feature allows only keyboard and mouse input, and will not handle input from a touch input device, or other alternate input devices.

These constraints lead to the advanced user interface design shown in FIG. 6. All input devices keyboard 130, device C 132, device D 134, device E 136 and device F 138, go through OS/2 TM 154 to be added to the single queue of OS/2 TM 154. The keyboard 130 goes directly through a standard device driver 140 to OS/2 TM 154. Device C 132, device D 134, device E 135 and device F 138, go through device-specific code 141, 142, 143 and 144, respectively, to the alternative input subsystem 203, before being passed to the single queue of OS/2 TM 154. Since the single queue will only handle keyboard or mouse input, the alternative input subsystem 203 converts the input signals from device C 132, device 134, device 136 and device 138 into mouse or keyboard input messages. In addition, since OS/2 TM 154 will not handle touch, voice or image "tokens" as input messages, all such inputs are passed through as a series of mouse move points or other "events". As in the previous embodiment, the AIS 203 keeps track of the time which each input signal was received as well as a record of the true input signal. OS/2 TM 154 then passes the input messages to Presentation Manager TM 156 which keeps track of the active application program.

In FIG. 6, PM-Link 201, the environmental link module of the Advanced User Interface 200, acts as a filter between Presentation Manager TM 156 and the application programs, Application E 150, Application F 151, Application G 152 and Application H 153. After receiving an input message from Presentation Manager TM 156 together with information about which is the active application program, the PM-Link 201 refers back to the alternate input subsystem 203 to determine whether the "keyboard" or "mouse" message it received is in fact a keyboard or a mouse message, or rather a touch, voice, image, or other message. The PM-Link 201 then passes the true message to the appropriate application program. The remaining modules of the advanced user interface 200 are not called unless the active application program indicates that the true input message is not understood. If the active application indicates that the true input message is not understood, PM-Link 201 then refers to the interface profiles module 204 to determine the correct command. If the true input message indicates that it may be a gesture, character, voice or image "token", the PM-Link 201 sends the input message to the appropriate recognition unit to identify the token, and then searches the interface profiles 204 to determine the correct command.

Figure 7:
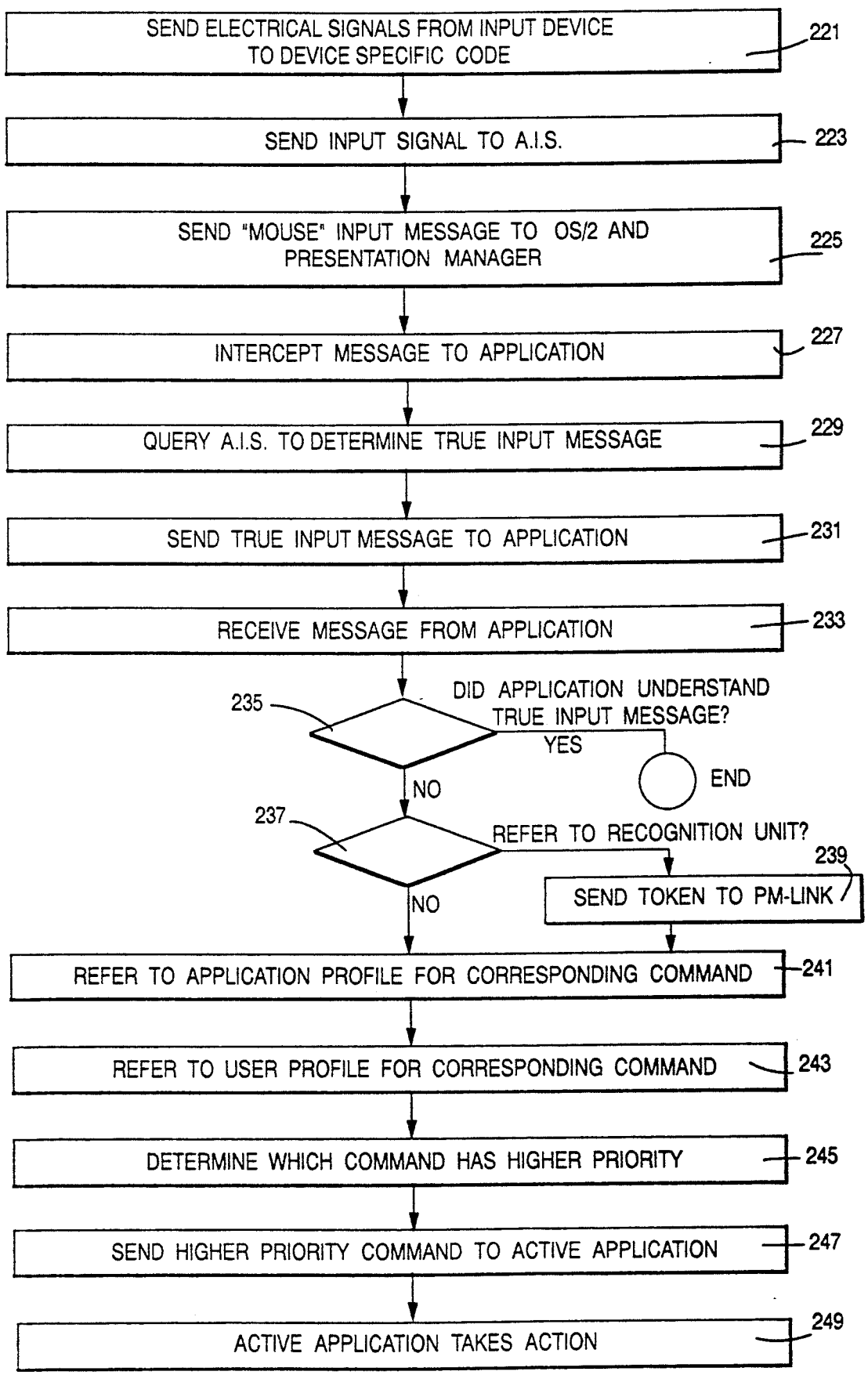
FIG. 7 is a flow diagram of the operation of the second embodiment of the present invention in response to a voice input signal.

The flow diagram in FIG. 7 depicts the operation of the computer system in FIG. 6 in response to a voice input signal. The active application program is the spreadsheet 150, and presented to the user on the display 28 is an array of selected data concurrently with a member of possible functions available to the user. Rather than using the keyboard 130, the user elects to input data using another input device, the voice sensor 136. In response to the user vocalizing the word "GRAPH", the voice sensor 136 generates electrical signals and thereby invokes the appropriate device specific code 144 is invoked at 221. The device specific code at 223 then sends a series of input signals to the AIS 203 corresponding to the word "GRAPH". The AIS 203 translates the input signals as a series of keyboard or mouse input messages to be added to the single queue of OS/2 TM 154 at 225. After timestamping the stream of input messages, OS/2 TM passes them to Presentation Manager TM 156 which keeps track of the focus of the user and passes the input messages to the active application program, the spreadsheet 150. The PM-Link 201 intercepts the message to the active application program at 227 and refers back to the AIS 203, to determine that the true input messages are a set of voice input messages at 229 and sends the true input messages, the voice input, to the spreadsheet 150 at 231.

After the PM-Link 201 transmits the true voice input message, the application program will respond with its own message at 233 and one of two things may occur. If the application does not understand the type of input message sent, it returns a "R0" message to the PM-Link 201 at 233, indicating that it does not understand the input message. The PM-Link 201, in response to an R0 message, would normally go to the interface profiles 204 to determine the corresponding command in the appropriate application profiles 205 at 241 and user profile 207 at 243. However, since the input messages indicate that they are a voice message at 237, the PM-Link 201 first sends the input messages to the voice recognition unit 215 to receive the correct voice input token for the word "GRAPH". After receiving this token at 239, the PM-Link 201 first looks in the application profile 205 of the spreadsheet 150 at 241 to find the corresponding command to the input message which will be recognized by the spreadsheet 150, i.e., the menu selection —graph—. Then the PM-Link 201 refers to the user profile 207 of the current user at 243. The PM-Link 201 then determines which profile has the higher priority command for the spreadsheet 150 at 243, and then sends the higher priority command to spreadsheet 150 at 247. The spreadsheet then takes the appropriate action at 249, in this case, graphing the currently selected data and changing the information presented to the user by the display 28.

If, on the other hand, the spreadsheet 150 can decipher, hand or is otherwise aware of voice input, an "R1" message is sent to the PM-Link 201 at 233. The PM-Link 201 would then take no further action for the current message. While the spreadsheet 150 may be aware of voice input, it may also elect to ignore the voice input in certain circumstances, or periods during the application program. Alternatively, the aware application 150 may understand some voice input, but not others, and send an R0 message back to the PM-Link 201 at 233 whenever it does not understand a particular voice input message. For those voice input messages for which it received an "R0" message, the PM-Link 201 would consult the voice recognition unit 215 and the interface profiles 204 as detailed above.

In the embodiment of FIG. 6, the character recognition 211 and the gesture recognition unit 213 are part of the Advanced User Interface 200. When PM-Link 201 receives an input message which might be a character or gesture, it sends the set of points to the character recognition unit 211. If the character recognition unit 211 recognizes the set of points as an alphanumeric character, that character is identified and sent back to PM-Link 201 for further processing in the active application program. If the set of points is not recognized as a character, the set of points is sent to the gesture recognition unit 213 to determine whether the set of points is recognized as a gesture. If it is recognized as a gesture, PM-Link 201 sends the gesture to the interface profiles 204 to find the set of instructions to send to the active application program from the appropriate application profile 205 or user profile 207. If it is not recognized as either a character or a gesture, the PM-Link 201 decides that the input message was probably intended as a mouse message and generates a "mouse buttondown, mouse buttonup" message at the last point in the set of points.

As an alternative to the default user profile described above, where various modes are used to determine what mouse equivalent commands are generated by user actions on the touch panel, the present invention can include a computer module within PM-Link 201 to differentiate between touch input which emulates a mouse buttondown event, mouse move event or a mouse buttonup event, and that touch input which is to be considered a gesture or character. This is done by using a time delay to differentiate between the two types of touch input. The Advanced User Interface 200 allows the user to touch the screen and move to the desired position before the application is notified of the event by placing all the points received from the touch sensor in a stroke buffer which either stylus liftoff or the stylus has delayed at a particular point for the set time delay. Once the user reaches the desired position and stops moving for the set time delay, the application program will receive the event through PM-Link 201 as a mouse event. For example, if the user stops moving for 200 milliseconds, a mouse buttondown - mouse buttonup event at the desired position is communicated to the application program. However, if the user starts to move again before the end of the set period of time, the event is not generated until the user once again stops and pauses for the period of time delays. The time delay is typically defined in milliseconds and may be varied depending upon the area of the screen with which the user is interacting. The time delay may be specified by the user in the user profile 207 or may be altered by the application program which is utilizing the touch input.

If, on the other hand, the user does not stop at a particular point for the specified time delay period and instead lifts the stylus off the touch screen, the Advanced User Interface 200 selects the set of input points as a candidate for character or gesture recognition. In other words, the time delay provides a window in time in which gestures can be made. During this time, the Advanced User Interface 200 will only allow gestures to be made. If the user waits for the time delay period before lifting off, the points collected will not be candidates for a gesture, but a mouse event. If the user lifts off before the time delay period expires, an attempt will be made to recognize the set of input points in the character recognition unit 211 or gesture recognition unit 213 as a gesture or character. If it is not recognized, however, the normal mouse emulation sequence will be generated: mouse buttondown, mouse buttonup at the last input point in the set. If it is recognized, the PM-Link 201 refers to the interface profiles 204 to send the appropriate commands to the active application program.

The recognition of a circle gesture drawn by a user on the face of the touch sensor 134 is described below with reference to FIG. 8.

A user having determined that he wishes to invoke the pop-up keyboard utility in the AUI utilities module 209, draws a circle on the face of the touch sensor 134 and lifts the stylus off before the end of the set time delay. The touch sensor 134 generates a series of interrupts to the device specific code 142 at 261 which passes a set of input signals to the AIS 203 corresponding to the set of points in the circle at 263. The AIS 203 translates the input signals to mouse input messages to be handled by the single queue in OS/2 TM 154 at 265. The input messages are sent to the active application program, the spreadsheet 150, by Presentation Manager TM 156, but are intercepted first by the PM-Link 201 at 267. The PM-Link 201 then queries the AIS 203 and determines that the "mouse" input messages are actually touch input at 269.

When PM-Link 201 discovers the first touch input point, usually a touch down on the sensor 134, it refers to the user profile 207 for the time delay period selected by the user at 271. At 273, the PM-Link 201 collects the touch input points in its stroke buffer until the stylus liftoff event is detected. As the PM-Link 201 collects the touch input points, each time the user pauses on the touch sensor within the stroke, initiating a "period of stability" at 275, the PM-Link 201 starts timing the period of stability to determine whether the time delay period has expired at 277. If the user moves before the time delay period has expired, the PM-Link 201 continues collecting the touch input points in tee stroke at 273. If, however, the period of stability exceeds the time delay, a mouse buttondown, mouse buttonup command is generated at 281. In this example, the user does not pause before the stylus is lifted, and therefore, the stroke is sent to the character recognition unit 211 and gesture recognition unit 213 for processing at 279. If the touch input stroke had not been recognized as either a gesture or character, a mouse buttondown, mouse buttonup command would be generated at 281.

After being recognized by the gesture recognition unit 213 as a circle gesture, the PM-Link 201 passes the circle gesture to the spreadsheet 150. The spreadsheet returns an "R0" message at 285, indicating that the circle gesture was not understood. Since the circle gesture was not understood at 287, the PM-Link 201 refers to the application profile 205 for the spreadsheet 150 at 289 and finds no corresponding command for the circle gesture. The PM-Link 201 then refers to the user profile 207 at 291 which contains the corresponding command "invoke the pop-up keyboard". As the command from the user profile 207 has the highest priority at 293, the PM-Link 201 sends this message to the AUI utilities module 209 at 295 and the pop-up keyboard is presented to the user on the display.

While the present invention has been described with reference to specific embodiments, it will be understood by those skilled in the art that changes in form and detail may be made without departing from the spirit and scope of the invention. For example, while gesture and character recognition has discussed in terms of a touch input device, another pointing input device such as a mouse or a graphic tablet can be utilized to send gestures or characters to the Advanced User Interface. In addition, while specific mention has been made of particular application programs, integrated operating environments and input devices, the flexibility of the Advanced User Interface can accommodate both further advances as well as the existing implementations of these programs and devices. The embodiments presented are for purposes of example and illustration only and are not to be taken to limit the scope of the invention narrower than the scope of the appended claims.

We claim:

1. An advanced user interface, for use with an integrated operating environment and an operating system capable of running a plurality of application programs simultaneously on a computer system, only one of which is active at a given time, the computer system having a central processor, a random access memory, a display and at least one input device which transmits input signals to the advanced user interface in response to actions performed by a user, comprising:
    interface profiles which contain mappings of input messages representative of the input signals against corresponding commands useable by at least one of the plurality of application programs; and,
    an environment link module coupled to the interface profiles, the integrated operating environment and the operating system, the environment link module receiving the input messages, determining which of the plurality of application programs was active at the time the input signals were transmitted by the input device, matching the input messages against the corresponding commands contained in the interface profiles according to the application program which was active at the time the input signals were transmitted by the input device, and sending the corresponding commands to an appropriate code module;

the computer system performing a given action in response to user actions different from those user actions for which the active application program was originally written without change to the active application program.

2. The advanced user interface as recited in claim 1 which further comprises an alternative input subsystem coupled to the input device and the environment link which translates the input signals to the input messages.

3. The advanced user interface as recited in claim 1, wherein the interface profiles comprise a plurality of application profiles each of which corresponds to one of the plurality of application programs, the application profiles containing mappings of input messages against corresponding command at least some of which are useable by its corresponding application program.

4. The advanced user interface as recited in claim 3, wherein the interface profiles further comprise a user profile which contains mappings of input messages against corresponding commands, the user profile useable with more than one of the plurality of application programs.

5. The advanced user interface as recited in claim 4, wherein at least one of the corresponding instructions contained in the user profile overrides at least one of the corresponding commands contained in the plurality of application profiles.

6. The advanced user interface as recited in claim 4, wherein at least one of the corresponding commands contained in the user profile is a default instruction which is sent only when the application profile of the active application program has no corresponding commands to the input message.

7. The advanced user interface as recited in claim 4, wherein the interface profiles further comprise a user profile for each user authorized to utilize the computer system.

8. The advanced user interface as recited in claim 2, wherein a plurality of input devices are coupled to the alternative input subsystem module.

9. The advanced user interface as recited in claim 8, wherein the interface profiles contain mappings of input messages from a different input device from the input devices for which at least one of the plurality of application programs were originally written.

10. The advanced user interface as recited in claim 9 wherein the interface profiles contain mappings of touch input messages against corresponding mouse commands.

11. The advanced user interface as recited in claim 10 wherein the interface profiles also contain mappings of touch input gesture tokens representing a series of points drawn by a user on an input surface detected by a touch input device against corresponding commands.

12. An advanced user interface, for use with an integrated operating environment and an operating system capable of running a plurality of application programs simultaneously on a computer system, only one of which is active at a given time, the computer system having a central processor, a random access memory, a display and at least one input device which transmits input signals to the advanced user interface in response to actions performed by a user, comprising:

an alternative input subsystem module coupled to the input device which translates the input signals to input messages compatible with the integrated operating environment;

interface profiles which contain mappings of the input messages against corresponding commands useable by at least one of the plurality of application programs; and, an environment link module coupled to the alternative input subsystem, the interface profiles and the integrated operating environment, the environment link module receiving the input messages, intercepting the compatible input messages before receipt by the active application program, querying the alternative input subsystem as to whether the compatible input messages are true input messages, determining which of the plurality of application programs was active at the time the input signals were transmitted by the input device, matching the true input messages against the corresponding commands contained in the interface profiles according to the application program which was active at the time the input signals were transmitted by the input device and sending the corresponding commands to an appropriate code module;

the computer system performing a given action in response to user actions different from those user actions for which the active application program was originally written without change to the application program.

13. The advanced user interface as recited in claim 12, wherein the environmental link first sends the true input messages to the application which was active at the time the input messages were transmitted by the input device, and responsive to a message indicating that the active application did not understand the true input message, matching the true input messages against the corresponding commands contained in the interface profiles according to the application program which was active at the time the input signals were transmitted by the input device and sending the corresponding commands to an appropriate code module.

14. A computer system having a central processor and a random access memory having an advanced user interface, an integrated operating environment and an operating system resident in the memory capable of running a plurality of application programs simultaneously, only one of which is active at a given time, comprising:

a plurality of input devices which transmit input signals to the advanced user interface in response to actions performed by the user;

translating means coupled to the plurality of input devices to translate the input signals to input messages;

interface profiles which contain mappings of the input messages against corresponding commands useable by at least one of the plurality of application programs;

an environment link module coupled to the translating means input subsystem, the interface profiles and the integrated operating environment, the environment link module receiving the input messages, determining which of the application programs wa active at the time the input signals were transmitted by the input devices, matching the input messages against the corresponding commands contained in the interface profiles for the application program which was active at the time the input signals were transmitted by one of the plurality of input devices, and sending the corresponding commands to an appropriate code module; and, a display that presents information concerning the status, results, choices and other items associated with the plurality of application programs;

the computer system performing a given action in response to user action different from those user actions for which the active application program was originally written without change to the active application program.

15. The computer system as recited in claim 14, which further comprises a second plurality of input devices coupled to the integrated operating environment through standard device drivers.

16. The computer system as recited in claim 15, wherein at least one of the second plurality of input devices is also coupled to the translating means.

17. The computer system as recited in claim 14, which further comprises a gesture recognition unit which interprets the input signals transmitted by a touch input device in response to a user drawing symbols on a surface detected by the touch input device.

18. The computer system as recited in claim 14, which further comprises a character recognition unit which interprets the input signals transmitted by a touch input device in response to a user writing alphanumeric characters on a surface detected by the touch input device.

19. The computer system as recited in claim 14, wherein input messages of a touch input device are mapped against corresponding mouse commands for at least one of the plurality of application programs.

20. The computer system as recited in claim 14, wherein the interface profiles comprise a plurality of application profiles each of which is for one of the plurality of application programs containing mappings of input messages against corresponding commands at least some of which are useable by its corresponding application program.

21. The computer system as recited in claim 20, wherein the interface profiles further comprise a user profile which contains mappings of input messages against corresponding commands, the user profile useable with more than one of the plurality of application programs.

22. The computer system as recited in claim 21, wherein at least one of the corresponding commands contained in the user profile overrides at least one of the corresponding commands contained in the plurality of application profiles.

23. The computer system as recited in claim 21, wherein at least one of the corresponding commands contained in the user profile is a default command which is sent only when the application profile of the active application program has no corresponding command to the input message.

24. The computer system as recited in claim 21, wherein the interface profiles further comprise a user profile for each user authorized to utilize the computer system.

25. The computer system as recited in claim 14, which further comprises a touch input device disposed over the viewing surface of the display device, and wherein the advanced user interface further comprises a pop-up keyboard module which displays an image of a keyboard on the display device and in response to a selection of a key in the keyboard transmits a character string to the an appropriate computer module in the random access memory.

26. The computer system as recited in claim 14, wherein the advances user interface further comprises an image magnifying utility which magnifies a selected portion of an image displayed on the display device so that a more precise pointing operation can be accomplished.

27. The computer system as recited in claim 14, wherein the interface profiles contain mappings of input messages from a different input device form the input devices for which at least one of the plurality of application programs was originally written.

28. The computer system as recited in claim 14, wherein the advanced user interface further comprises an advanced user interface control panel to allow a user to create and modify the advanced user interface in a user friendly manner.

29. A computer system having a central processor and a random access memory having an operating system, an advanced user interface and an integrated operating environment and an operating system resident in the memory capable of running a plurality of application programs simultaneously, only one of which is active at a given time, comprising:

a plurality of input devices which transmit input signals to the advanced user interface in response to actions performed by the user;

an alternative input subsystem module coupled to the input device which translates the input signals to input messages compatible with the integrated operating environment and the operating system;

interface profiles which contain mappings of the input messages against corresponding commands useable by at least one of the plurality of application programs; and, an environment link module coupled to the alternative input subsystem, the interface profiles and the integrated operating environment, the environment link module receiving the input messages, intercepting the compatible input messages before receipt by the active application program, querying the alternative input subsystem as to whether the compatible input messages are true input messages, determining which of the plurality of application programs was active at the time the input signals were transmitted by the input device, matching the true input messages against the corresponding commands contained in the interface profiles according to the application program which was active at the time the input signals were transmitted by the input device and sending the corresponding commands to an appropriate code module; and, a display that presents information concerning the status, results, choices and other items associated with the plurality of application programs;

the computer system performing a given action in response to user actions different from those user actions for which the active application program was originally written without change to the application program.

30. The computer system as recited in claim 29, wherein the environmental link sends the true input messages to the application which was active at the time the input messages were transmitted by the input device and only responsive to a message indicating that the active application did not understand the true input message, matching the true input messages against the corresponding commands contained in the interface profiles according to the application program which was active at the time the input signals were transmitted by the input device and sending the corresponding commands to an appropriate code module.

31. A set of interface profiles for use with an advanced user interface in combination with an integrated operating environment and an operating system capable of running a plurality of application programs simultaneously on a computer system only one of which is active at a given time, the set of interface profiles comprising mappings of input messages representative of the input signals of an input device coupled to the advanced user interface mapped against corresponding commands useable by at least one of the plurality of application programs when active, the advanced user interface referring to the interface profiles responsive to a determination of which of the plurality of application programs was active at the time an input signal was sent so that the computer system performs a given action in response to user actions different from user actions for which at least one of the application program was originally written without change to the application.

32. The set of interface profiles as recited in claim 31, which further comprise a plurality of application profiles each of which corresponds to one of the plurality of application programs containing mappings of input messages against corresponding commands at least some of which are useable by its corresponding application program.

33. The set of interface profiles as recited in claim 32, which further comprise a user profile which contains mappings of input messages against corresponding commands, the user profile useable with more than one of the plurality of application programs.

34. The set of interface profiles as recited in claim 33, wherein at least one of the corresponding commands contained in the user profile overrides at least one of the corresponding commands contained in the plurality of application profiles.

35. The set of interface profiles as recited in claim 34, wherein at least one of the corresponding commands contained in the user profile is a default instruction which is sent only when the application profile of the active application program has no corresponding command to the input message.

36. The set of interface profiles as recited in claim 34, wherein the interface profiles further comprise a user profile for each user authorized to utilize the computer system.

37. The set of interface profiles as recited in claim 31, wherein the interface profiles contain mappings of touch input messages against corresponding mouse commands.

38. The set of interface profiles as recited in claim 31, wherein the interface profiles also contain mappings of touch input gesture tokens against corresponding commands, the touch input gesture tokens representing a series of points drawn by a user on an input surface detected by a touch input device.

39. A method of operating a computer system with an integrated operating environment and an operating system capable of running a plurality of application programs simultaneously only one of which is active at a given time by the use of an advanced user interface, the computer system having a central processor, a random access memory, a display and at least one input device which transmits input signals to the advanced user interface, comprising the steps of:

determining which one of the application programs was active at the time the input signals were transmitted by the input device;

finding a corresponding command to the input message representative of the input signals in a set of interface profiles for the active application program, the interface profiles comprising mappings of the input messages against corresponding commands; and, sending the corresponding command to an appropriate code module; the computer system performing a given action in response to user actions different from those user actions for which the active application program was originally written without change to the active application program.

40. The method of operating a computer system as recited in claim 39 which further comprises the steps of:

receiving the input signals transmitted from the input device in response to actions performed by a user; and, translating the input signals into input messages.

41. The method of operating a computer system as recited in claim 39 wherein the input device is a touch input device, and the interface profiles contain mappings of touch input messages against corresponding mouse commands.

42. The method of operating a computer system as recited in claim 41, wherein the interface profiles also contain mappings of touch input gesture tokens against corresponding commands, the touch input gesture tokens representing a series of points drawn by a user on an input surface detected by a touch input device.

43. The method of operating a computer system as recited in claim 39, wherein the finding step comprises the steps of:

finding a corresponding command to the input messages in an application profile for the active application;

finding a corresponding command to the input messages in a user profile for the user operating the computer system; and, determining which corresponding command has higher priority.

44. The method of operating a computer system as recited in claim 39, wherein the corresponding command is sent to the active application program.

45. The method of operating a computer system as recited in claim 39, wherein the corresponding command is sent to a utilities module of the advanced user interface.

46. A method of operating a computer system with an integrated operating environment and an operating system capable of running a plurality of application programs simultaneously only one of which is active at a given time by the use of an advanced user interface, comprising the steps of:

receiving input signals transmitted from at least one input device in response to actions performed by a user;

translating the input signals into an input message compatible with the integrated operating environment;

intercepting the compatible input message before receipt by an active application program;

determining whether the compatible input message is a true input message;

determining which one of the application programs was active at the time the input signals were transmitted;

finding a corresponding command to the true input message in a set of interface profiles for the active application program, the interface profiles comprising mappings of the true input messages against corresponding commands; and, sending the corresponding command to an appropriate code module;

the computer system performing a given action in response to user actions different from those user actions for which the active application program was originally written without change to the active application program.

47. The method of operating a computer system as recited in claim 46 which further comprises the step of sending the true input message to the application which was active at the time the input signal were received and wherein only responsive to a message that the active application did not understand the true input message performing the finding and sending steps.

* * * * *